United States Patent [19]
Ferguson

[11] 3,874,049
[45] Apr. 1, 1975

[54] METHOD OF MAKING A POWDERED METAL PART HAVING A BEARING SURFACE

[75] Inventor: Howard A. Ferguson, Coldwater, Mich.

[73] Assignee: Russell, Burdsall & Ward, Inc., Greenwich, Conn.

[22] Filed: Apr. 13, 1973

[21] Appl. No.: 350,939

[52] U.S. Cl.... 29/149.5 DP, 29/149.5 PM, 29/420.5
[51] Int. Cl............................ B21d 53/10, B22f 3/24
[58] Field of Search........... 29/149.5 DP, 149.5 PM, 29/420.5, DIG. 18, DIG. 31

[56] References Cited
UNITED STATES PATENTS
2,763,519  9/1956  Thomson .................. 29/149.5 PM
3,445,148  5/1969  Harris et al. ................ 29/149.5 PM
3,785,038  1/1974  Zapf.................................. 29/420.5

FOREIGN PATENTS OR APPLICATIONS
613,275  11/1949  United Kingdom ...... 29/149.5 PM
772,260  1/1955  United Kingdom ...... 29/149.5 DP Primary Examiner—C. W. Lanham
Assistant Examiner—D. C. Reiley, III
Attorney, Agent, or Firm—Burton & Parker

[57] ABSTRACT

A method of forming powdered metal parts having a good bearing surface wherein a sintered preform is cold formed and during such forming shear forces are applied to the surface of the preform where the bearing surface is desired by causing a movable die to penetrate and wipe along such surface area of the preform.

5 Claims, 10 Drawing Figures

METHOD OF MAKING A POWDERED METAL PART HAVING A BEARING SURFACE

FIELD OF INVENTION

This invention relates to the manufacture of powder metal parts and in particular to powder metal parts having a bearing surface characterized by its resistance to spalling and its compressive deformation, and possessing a high tensile strength.

BACKGROUND OF THE INVENTION

Heretofore it has not been possible, so far as I know, to provide powdered metal parts with bearing characteristics of the aforementioned type. According to conventional practice powdered metal is placed in a mold and compacted to form what is termed a "green preform". This preform is then sintered to cause a fusion of the powder particles. Thereafter the preform may be either hot or cold formed to increase density and improve strength. While powdered metal parts thus formed may possess good strength and fatigue resistance, such processes do not yield a bearing surface capable, for example, of serving as a ball or roller raceway for a ball or roller bearing assembly.

Heretofore various publications have appeared dealing with methods of hot and cold forming powdered metal parts, for example:

*Cold and Hot Forging P/M Preforms* by Harry W. Antes, published in 1971 by the Society of Manufacturing Engineers, 20501 Ford Road, Dearborn, Michigan;
*Sintered Metal Preforms and the Future*, by A. Lawley, supra;
*Powder Metallurgy Forging A Process Evaluation and Bibliography*, by Henry H. Hausner, published in 1971 by The Franklin Institute Research Laboratories, Benjamin Franklin Parkway, Philadelphia, Pa.; *Powder Preform Design*, by H. A. Kuhn and C. L. Downey, published in 1971 by Society of Manufacturing Engineers, supra. A review of these and other publications which have come to my attention do not suggest a method of providing a good bearing surface on a powder metal part.

SUMMARY OF THE INVENTION

The problem, as I have visualized it, is to shape the bearing surface to the desired configuration while at the same time densifying it and the underlying metal of the part to a point closely approaching theoretical maximum density. I have found that by following the teachings hereinafter set forth it is possible to provide a powder metal part averaging 1 percent to 2 percent porosity with a selectively densified surface configuration suitable as a ball or roller raceway. Further, I have found that the density at such surface is essentially 100 percent and the metal at such surface possesses excellent tensile and compressive strengths, good elongation characteristic, and requires no further machining to improve surface finish. In some instances where use conditions require it, the bearing surface may thereafter be hardened according to conventional techniques. Such hardening does not affect the surface finish of the bearing.

In carrying out my method a quantity of powdered metal is first compacted to form a green preform which is then sintered. Following sintering the preform is allowed to cool to room temperature and then is placed in a die cavity. A cooperating die element is then moved into the cavity and against the preform to begin reshaping thereof. During such reshaping the preform is compressed in an upsetting mode which serves to initiate densification of the preform. As such densification progresses the preform moves to fill the cavity. The allowable amount of this movement must be limited by the cavity walls contacting the preform to begin a repressing mode of densification before the tensile strength of the preform is exceeded and fracture occurs. To this point the process steps are known in the art as set forth in the foregoing publications. However, without more, the thus formed powdered metal part will not have the excellent bearing surface imparted thereto which is the object of my invention.

To provide the bearing surface, I have discovered that if the movable die element is shaped to provide a die surface reflecting the desired configuration of the bearing surface to be formed, and the preform is initially designed to have a surface confronting such die surface such that as the two surfaces are forced together there is a relative movement therebetween in which the die surface penetrates and then wipes through or along the preform surface, not only may a high degree of densification at the surface of the preform in contact with the die surface be achieved but additionally and importantly, substantial deformation of the grain structure in the surface of the preform is accomplished. By proper design of the preform and the movable die element, this deformation of the grain structure leads to a substantial increase in the tensile strength of the part at and subjacent the surface intended to be the bearing surface.

DESCRIPTION OF THE PREFERRED EMBODIMENT

Figure 1:
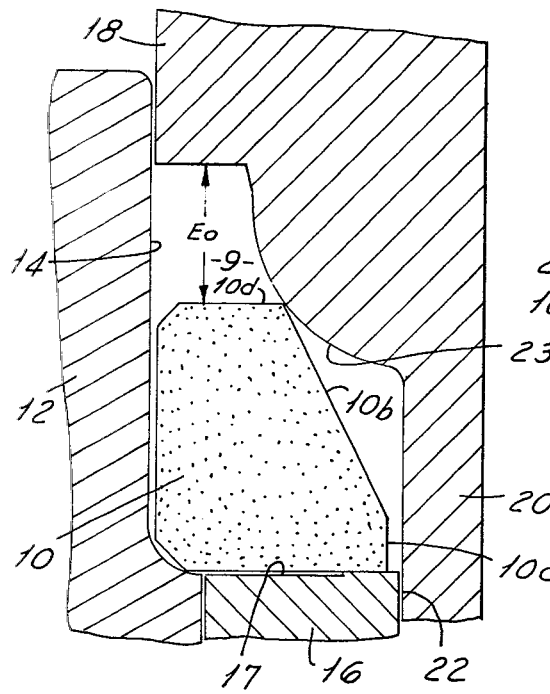
FIG. 1 is a cross-sectional view through a portion of an annular die cavity for forming a ball bearing race, showing a sintered preform therein and the movable die member or punch in initial contact therewith.

In the manufacture of powder metal parts according to my invention, powdered metal of the desired particle size and composition is compacted or molded into a preform of determined configuration. Such molding may be carried out using conventional equipment. Thereafter the green preform is sintered to fuse the powder particles. After the preform has cooled it is placed in a die cavity 9 as shown in FIG. 1 for cold forming. In the embodiment herein disclosed the powder metal part to be formed is a ball bearing race. The preform is indicated in cross section in FIG. 1 at 10. The die cavity 9 is defined by a female member 12 having an inner wall surface 14. An ejector ring 16 closes the bottom of the cavity. A movable die part or punch 18 is adapted to enter the cavity and bear against the preform. The punch includes a pilot shank portion 20 which extends down through the cavity and through an aperture 22 in the ejector ring. The punch also includes a die face 23 which reflects the configuration of the bearing surface, or raceway 10a (see FIG. 4) to be formed in the bearing race.

Figure 5:
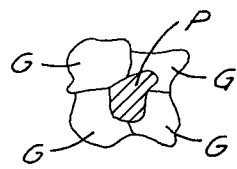
FIG. 5 represents the typical grain structure of a sintered preform, as for example would appear in a photomicrograph of the grain structure of the preform in FIG. 1.
Figure 6:
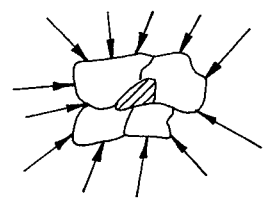
FIG. 6 shows an idealized representation of hydrostatic compression which occurs during forming of the preform.

Prior to placing the preform in the cavity, the preform may be lubricated in any suitable fashion, as by a phosphate coating, to facilitate the forming operation. As shown in FIG. 1 the punch 18 has just entered the die cavity and the die face 23 has made contact with the preform 10 at a prescribed distance $E_o$. To obtain the required metal flow this distance $E_o$ is a controllable variable, and is calculated to provide maximum deformation at the preform 10 at minimum load requirements. Further, it is a controlling factor in determining the desired stress state of the preform to prevent fracturing due to excessive tensile stresses. At this stage, the grain formation of the preform is illustrated in FIG. 5 and comprises equiaxed grain structure with an essentially spheroidized interconnected porosity. Four grains G are shown surrounding a pore or void P. The density of the preform at this stage may range from 75 percent to 90 percent of theoretical maximum density and is normally around 85 percent.

It should be understood that FIGS. 1 through 4, while illustrating various stages in the forming operation, are actually idealized representations of momentary phases in one continuous motion of the punch 18 into the die cavity and the concomitant shaping and densification of the preform into the final powder metal bearing race.

Figure 2:
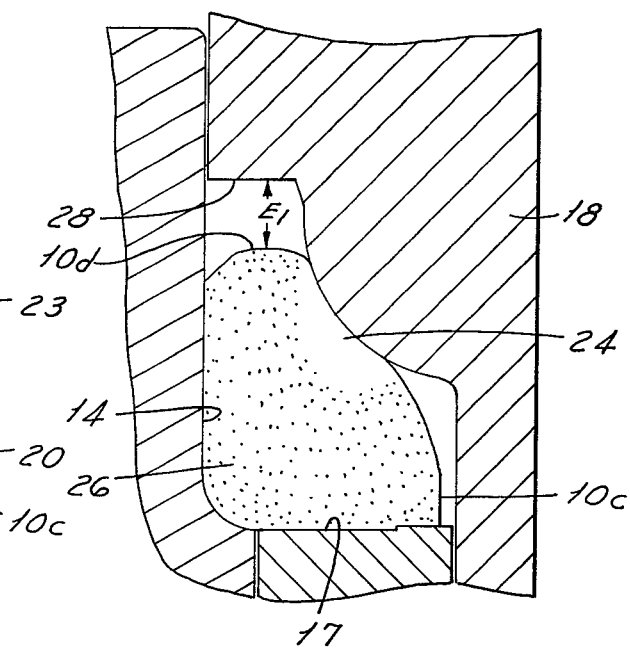
FIG. 2 is similar to FIG. 1 but shows the punch further advanced into the die cavity and the preform undergoing initial compaction type deformation.
Figure 7:
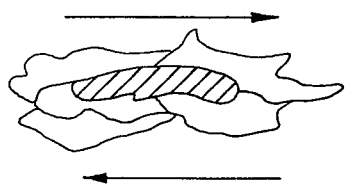
FIG. 7 illustrates densification of grain structure by shearing.

In FIG. 2 the punch has moved a greater distance into the die cavity and has created localized metal consolidation within the preform. This has densified the working area of the bearing race at 24 but has not at this point created any appreciable external metal flow. The grain formation in the area 24 is shown in FIG. 7 which depicts elongated grains with collapsed pores. This grain formation and void deformation has resulted from the shearing forces created by the movable die face 23 pressing against the opposed preform surface 10b and moving downwardly therealong with a shearing or wiping motion.

Considering further the preform in the stage shown in FIG. 2, the depth of deformation of the preform is directly proportional to the change in the distance from $E_o$ to $E_1$. At this stage the preform is being forced against the female die wall 14 and the bottom of the die as represented by the upper surface 17 of the ejector ring, with the forces being proportional to the distance $E_o - E_1$ the punch has moved.

Figure 3:
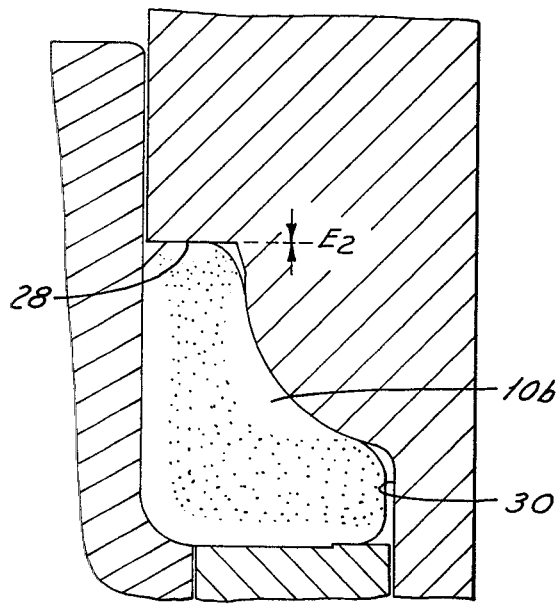
FIG. 3 is similar to FIG. 2 but shows further penetration of the punch into the die cavity.

In FIG. 3 the punch 18 has penetrated further into the die cavity and both radial and backward (upward) extrusion of the preform has occurred so that at the top of the preform it has just contacted the punch die surface 28 and a repressing mode is beginning to occur in the preform at this point. Here the distance $E_2$ is equal to 0. The amount of backward metal flow is a function of preform shape and is controlled precisely to within the limit of metal flow before fracture of the preform. At the point where the distance $E_2$ equals 0 the stress state within the preform changes from tension (occurring during the backward or external metal flow) to compression which eliminates the possibility of fracture. Upon going into compression, pores in the grain structure which have been elongated as a result of tensile shear forces begin to be collapsed and cold welded. This consolidation occurs at all the confined surface. It began along the outside diameter and bottom of the race when the preform was compressed thereagainst as from FIG. 2 to FIG. 3, and at the ball race surface area 10b where both shear and compressive forces have effected the greatest consolidation and the density of the preform in this area is approaching its theoretical maximum. Also at the FIG. 3 stage metal flow toward the punch die pilot surface 30 has begun to occur. The depth of grain elongation and pore shearing has by now extended to approximately three quarters of the distance through the cross section of the bearing race.

Figure 4:
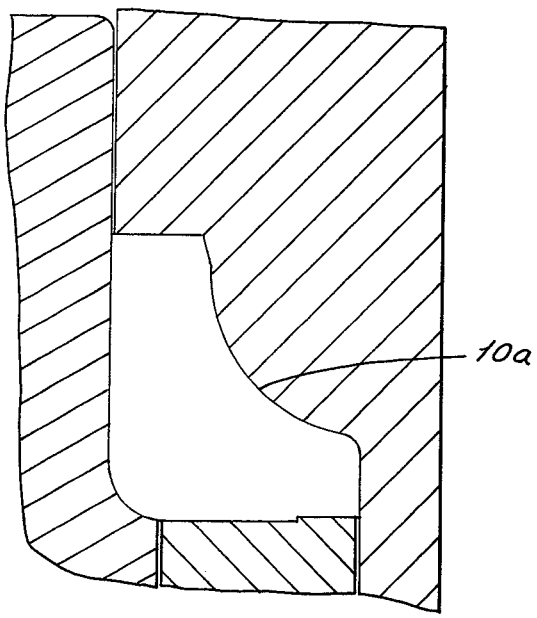
FIG. 4 shows full penetration of the punch into the cavity and completion of shaping of the preform.

In FIG. 4 lateral flow of the metal has completely filled the die cavity and the mode of deformation is equivalent to repressing, mentioned above, where a triaxial stress state exists equally over the entire surface of the preform. Here the preform has achieved its final desired shape and on the average throughout the preform there remains only 1 percent to 2 percent residual porosity. For example, in the grain structure at the raceway area 10a, the grains have substantially elongaged (see G-1, FIG. 9) and the pores (see P-1, FIG. 9) essentially completely if not entirely closed and fused such that the density may be considered as being substantially at the theoretical maximum. This has resulted from the high shear and compressive forces which were imposed on this area as the result of the cold working of the preform as the surface 23 of the punch wiped down along the face 10b of the preform. This area of the preform where greatest strength and good bearing qualities are most desired has undergone the greatest deformation and consolidation.

Figure 10:
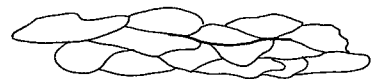
FIG. 10 illustrates the grain structure of the part at the outside diameter of the bearing race.

In FIG. 10, which may be considered as representative of the other surface areas of the preform in the FIG. 4 state, elongation and substantial pore collapse have also occurred giving rise to high tensile strength, but not quite to the extent as at the raceway area 10a.

Figure 8:
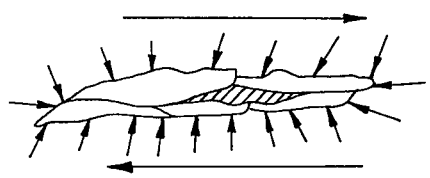
FIG. 8 illustrates densification of grain structure by both repressing and shear.
Figure 9:
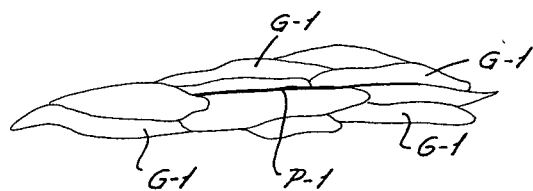
FIG. 9 illustrates the grain structure of the completed part in the area of the bearing surface.

FIG. 8 is illustrative of the repressing mode combined with shear deformation and the accompanying pore and grain elongation and pore collapse which leads particularly to the grain structure of FIG. 9 at the raceway area 10a. A similar but not quite as extreme shear occurs at the other surfaces of the preform as illustrated at FIG. 10.

The following examples are given as representative of the results that may be obtained using the foregoing method.

EXAMPLE I

A preform of the configuration shown in FIG. 1 was made using Type 15F2 manganese steel alloy powder furnished by A. O. Smith-Inland Inc., Milwaukee, Wisconsin, comprising approximately:

0.55% Manganese
0.3% Carbon

Balance Iron having an apparent density of 3.2 grams/c.c. This preform was made by compacting the powder in a compacting die with a force of approximately 30 tons per square inch. The resultant density of the green preform was about 6.7 grams/c.c. The green preform was then sintered in a conventional cycle of 2,050°F. from 20 to 30 minutes in an endothermic atmosphere with a neutral carbon potential. The sintered preform was then slowly cooled to obtain an equilibrium of microstructure of ferrite and pearlite. The preform was then lubricated with a phosphate coating and placed in a forming die of the design illustrated in FIG. 1 and formed at a die force of between 60 and 70 tons per square inch to completely fill the die cavity as hereinabove described. Measurement of the resulting density ranged from between 98 percent to 100 percent of theoretical maximum, and was greatest in the area of the ball race.

EXAMPLE II

In this case the metal powder was furnished by the same supplier under designation 46F2 and had a composition of:

0.35% Manganese
0.45% Nickel
0.55% Molybdenum
0.3% Carbon
Balance Iron

With a density of 6.7 grams/c.c. following sintering, of the character above mentioned, the preform was calculated as having the following typical characteristics:

| Rockwell Hardness | R B | 65 |
| --- | --- | --- |
| Yield Strength | | 44,000 p.s.i. |
| Tensile Strength | | 57,000 p.s.i. |
| Elongation | | 2% |

Following forming according to the method above described the following typical characterists were noted:

| Rockwell Hardness | R B | 105 – 110 |
| --- | --- | --- |
| Yield Strength | | 85,000 p.s.i. |
| Tensile Strength | | 120,000 p.s.i. |
| Elongation | | 10% |
| Density | from | 98% to 100%. |

In ball bearing races of Examples I and II excellent spalling resistance, high compressive yield strength and tensile strength were obtained for the bearing raceway. No further machining to improve the surface finish was necessary.

From the foregoing it will be apparent that I have disclosed a method of selective reshaping and densification of a powder metal preform resulting in a powder metal part having excellent qualities for the intended use. As mentioned at the outset I attribute the success of this method to the design of the preform in relation to the dies to be used in its forming so that not only is the preform subjected to densification by upsetting and repressing modes, but in the area where the bearing surface is intended, the movable die part has a surface reflecting the desired shape of the bearing surface and such die surface is moved against and wiped along the surface of the preform to subject the latter to substantial cold working shear and compressive forces resulting in substantial elongation of the grains and pores and what amounts to essentially complete pore collapse and fusion.

In further explanation of the process as disclosed in FIGS. 1–4 it will be noted that just at the point where the punch surface 23 first engages the sloping surface 10b of the preform, there is an available volume within the die cavity surrounding the free surface of the preform into which the preform may be moved as the punch descends. This available volume is theoretically equal to the total pore or void volume of the preform. Consequently upon descent of the punch from FIG. 1 through the successive stages of FIGS. 2, 3 and 4 the preform is reshaped to fill the available volume within the die cavity and the pores or voids in the preform are essentially closed or eliminated. The free surface of the preform is spaced from opposing surfaces of the die cavity by an amount which will allow movement, and consequent cold deformation of the preform, but such movement is limited by the opposed die surfaces so that the tensile stresses within the preform associated with movement of the preform do not exceed the tensile strength of the preform.

It will also be noted that the surface 10b of the preform where the bearing surface is to be created is arranged to slope along and across the path of travel of the die face 23 of the descending punch so that the compression and shear forces are maximum at and along the surface 10b and subsequently 10a (FIG. 4) of the preform.

What is claimed is:

1. The method of forming a highly densified metal part having a high density bearing surface thereon, comprising:
   a. compacting a quantity of powdered metal into a preform;
   b. sintering the preform;
   c. cooling the preform;
   d. at room temperature in a die shaping the preform to the desired configuration of the metal part including subjecting the preform to both tensile and shear stresses, commencing at the intended bearing surface and progressing substantially throughout the remainder of the preform, of sufficient magnitude to substantially elongate the grain and pore structure of the preform; and
   e. subjecting the preform to compressive stresses at the intended bearing surface and thereafter at the other surfaces as the tensile shear stresses approach the point of fracture of the preform, such compressive forces being of sufficient magnitude to prevent fracture of the preform and cause collapse of the elongated pores and welding of the grains across the collapsed pore boundaries throughout the powdered metal part.

2. The invention as defined by claim 1 characterized by moving a die part against and wiping it along the intended bearing surface.

3. The method of forming a highly densified metal part having a high density bearing surface thereon, comprising:
   a. compacting a quantity of powdered metal into a preform;
   b. sintering the preform;
   c. cooling the preform;
   d. at room temperature in a die with a single strike shaping the preform to the desired final configuration of the metal part including subjecting the preform to a combination of tensile shear and compressive stresses, commencing at the intended bearing surface and progressing throughout the remainder of the preform, of sufficient magnitude to substantially elongate the grain and pore structure of the preform; and e. subjecting the preform to repressive forces during the strike as the tensile stresses approach the fracture point of the metal, such repressive forces being of sufficient magnitude to prevent fracture and cause collapse of the pores and welding of the grains together across the elongated pores substantially throughout the metal part.

4. The invention defined by claim 3 characterized by moving a die part against and wiping it along the intended bearing surface.

5. The method of forming a highly densified metal part having a high density bearing surface thereon, comprising:

a. compacting a quantity of powdered metal into a preform;
b. sintering the preform;
c. cooling the preform;
d. at room temperature in a die with a single strike shaping the preform to the desired configuration of the metal part by subjecting the preform simultaneously to a combination of metal flows both opposite to and transverse of the direction of the strike movement to elongate the grains and pores;
e. and before fracture of the metal imposing repressive forces upon the metal part of sufficient magnitude to prevent fracture and cause collapse of the pores and weld of the grains across the collapsed pores.

* * * * *